United States Patent [19]

Langan

[11] 4,250,234
[45] Feb. 10, 1981

[54] DIVALENT SILVER OXIDE CELL

[75] Inventor: Richard A. Langan, Parma, Ohio

[73] Assignee: Union Carbide Corporation, New York, N.Y.

[21] Appl. No.: 79,885

[22] Filed: Sep. 28, 1979

[51] Int. Cl.$^3$ ............................................. H01M 6/06
[52] U.S. Cl. .................................... 429/206; 429/219; 429/57
[58] Field of Search ................... 429/219, 57, 59, 206, 429/222, 229, 218

[56] References Cited

U.S. PATENT DOCUMENTS

| 4,009,056 | 2/1977 | Megahed et al. | 429/219 X |
| 4,015,056 | 3/1977 | Megahed et al. | 429/219 |
| 4,038,467 | 7/1977 | Lippold et al. | 429/219 |
| 4,048,405 | 9/1977 | Megahed | 429/219 X |
| 4,068,049 | 1/1978 | Naruishi et al. | 429/219 X |
| 4,187,328 | 2/1980 | Jumel | 429/219 X |

FOREIGN PATENT DOCUMENTS 53-76325  7/1978  Japan .

Primary Examiner—Anthony Skapars
Attorney, Agent, or Firm—Cornelius F. O'Brien

[57] ABSTRACT

A divalent silver oxide cell wherein the surface of the divalent silver oxide electrode facing the separator is reduced to monovalent silver oxide so as to improve high temperature stability of the silver oxide electrode in contact with the cell's electrolyte.

13 Claims, No Drawings

DIVALENT SILVER OXIDE CELL

FIELD OF THE INVENTION

The invention relates to a silver oxide alkaline cell and a method for producing the cell which employs an alkaline electrolyte, a negative electrode, a divalent silver oxide-containing positive electrode and a separator disposed between the negative electrode and the positive electrode and wherein the improvement comprises at least a major portion of the surface of the divalent silver oxide-containing positive electrode facing the separator reduced to monovalent silver oxide with the remaining surfaces of the electrode being substantially divalent silver oxide.

BACKGROUND OF THE INVENTION

The battery has become a primary power source for many portable electronic devices such as radios, hearing aids, watches, calculators and the like. In order to maintain the overall electronic device as compact as possible the electronic devices are usually designed with cavities to accommodate miniature cells as their source of power. The cavities are usually made so that a cell can be snugly positioned therein thus making electronic contact with appropriate terminals within the device. A major potential problem in the use of a high energy density cell such as a divalent silver oxide/zinc/alkaline cell is that if the cell bulges, it usually becomes wedged within the cavity of the device which sometimes can result in damage to the device. In addition, when the cell bulges it may disturb the seal whereupon the electrolyte might escape to cause damage to the device and/or oxygen from the atmosphere may enter which could cause wasteful corrosion of the anode. On the other hand, if the seal of the cell is maintained, high internal gas pressure may develop which could cause not only bulging of the cell but even possible disassembly of the cell.

Although divalent silver oxide is a good high capacity positive active material when used in alkaline cells, it is rather unstable when in contact with an aqueous alkaline electrolyte. Specifically, divalent silver oxide is a highly oxidizing material and as such it is capable of reacting in an aqueous alkaline electrolyte to yield oxygen gas. In addition, divalent silver oxide will liberate oxygen when it decomposes to form monovalent silver oxide when in contact with the aqueous alkaline electrolyte. Divalent silver oxide can also attack cellulosic materials in the cell, such as the separator, to form carbonate ion at the expense of even more electrolyte. These are undesirable processes because they lead to bulging of the cell, deterioration of its parts and loss of service.

U.S. Pat. No. 3,853,623 discloses one approach to stabilize divalent silver oxide in a silver oxide/zinc/alkaline cell through the use of gold ions incorporated into the alkaline electrolyte on the positive side of the cell's separator or gold oxide added to the positive active material of the cell.

U.S. Ser. Nos. 891,823 and 891,824 both filed on Mar. 30, 1978 disclose an alkaline silver oxide cell employing a divalent silver oxide-containing electrode wherein either a cadmium compound or zinc oxide additive, respectively, is incorporated in the cell to improve the chemical stability of the divalent silver oxide when in contact with the cell's alkaline electrolyte.

U.S. Pat. No. 4,015,056 discloses a method for manufacturing a stable divalent silver oxide depolarizer mix wherein the mix is treated with a mild reducing solution of a reducing agent such as methanol followed by a treatment with a strong reducing solution of a reducing agent such as hydrazine to form a layer of silver on the surface of the depolarizer mix.

U.S. Pat. No. 4,009,056 discloses a primary alkaline cell having a stable divalent silver oxide depolarizer mix comprising a negative electrode, a divalent silver oxide depolarizer mix, a separator between said negative electrode and depolarizer mix, and an alkaline electrolyte and wherein the surface of the depolarizer mix is treated with a mild reducing solution to form a reduced layer surrounding the mix and the surface of the reduced layer adjacent to the separator is coated with a layer of silver. It is further disclosed that the reduced layer surrounding the depolarizer mix in combination with the layer of silver provides improved stability of the depolarizer mix in the alkaline electrolyte and a single voltage plateau during discharge of the cell.

U.S. Pat. No. 4,048,405 discloses a high drain rate, primary alkaline cell comprising a negative electrode, a divalent silver oxide/monovalent silver oxide depolarizer blend, a separator between said negative electrode and depolarizer blend, and an alkaline electrolyte consisting essentially of potassium hydroxide and wherein the surface of the depolarizer blend adjacent to the separator is coated with a layer of silver. It is stated that the reduced surface layer of the depolarizer provides improved stability of the depolarizer blend in the alkaline electrolyte, and it provides the cell with a single voltage plateau during discharge.

It is an object of the present invention to provide a divalent silver oxide-containing cell in which the internal gas pressure buildup is reduced so as to effectively eliminate distortion of the cell's housing.

It is another object of the present invention to provide a divalent silver oxide cell wherein the surface of the divalent silver oxide-containing electrode that faces the separator is substantially reduced to monovalent silver oxide so as to effectively control gas pressure buildup within the cell and thereby effectively eliminate distortion of the cell's housing.

It is another object of the present invention to provide a divalent silver oxide cell wherein a major portion (over 50 percent) of the surface of the divalent silver oxide-containing electrode that faces the separator is in-situ reduced to monovalent silver oxide so as to effectively control gas buildup within the cell and thereby effectively eliminate distortion of the cell's housing.

It is another object of the present invention to provide a method for producing a divalent silver oxide-containing cell in which the surface of the divalent silver oxide-containing electrode facing the separator is in-situ reduced by a mild reducing agent to form monovalent silver oxide so as to effectively control gas buildup within the cell and thereby effectively eliminate distortion of the cell's housing.

The foregoing and additional objects will become more fully apparent from the following description.

SUMMARY OF THE INVENTION

The invention relates to a silver oxide cell having an alkaline electrolyte, a negative electrode, a divalent silver oxide-containing positive electrode and a separator disposed between the negative electrode and the positive electrode and wherein the improvement comprises at least a major portion (over 50 percent and preferably over 75 percent) of the surface of the divalent silver oxide-containing positive electrode facing the separator reduced (preferably in-situ) to monovalent silver oxide with the remaining surfaces of the electrode being substantially divalent silver oxide.

The invention also relates to a method for producing a silver oxide cell comprising the steps:

(a) placing a divalent silver oxide-containing electrode within a container;

(b) depositing a mild reducing agent on the exposed surface of the divalent silver oxide-containing electrode so that a major portion of the surface can be reduced in-situ to monovalent silver oxide;

(c) assembling over the surface of the divalent silver oxide-containing electrode a separator including an electrolyte followed by a negative electrode and closure; and (d) electronically insulating and sealing the closure to the container.

As used herein, a divalent silver oxide-containing positive electrode shall mean an electrode wherein the active cathode material is divalent silver oxide (AgO) or an electrode wherein the major active material, i.e., over 50 percent by weight of the active material, is divalent silver oxide in conjunction with monovalent silver oxide ($Ag_2O$) and/or some other electrochemically active positive material.

As used herein, a mild reducing agent is one that will reduce divalent silver oxide to monovalent silver oxide. Suitable mild reducing agents for use in this invention would be an alcohol such as methanol, ethanol or the like.

In high temperature environments, e.g., 160° F., a divalent silver oxide-containing electrode can be stablized when in contact with an aqueous alkaline electrolyte by reducing to monovalent silver oxide a major portion, preferably the complete area, of the surface of the electrode disposed adjacent the cell's separator. A mild reducing agent, such as methanol, can be used by applying it to the center portion of the surface of a cathode pellet thereby causing the formation of a monovalent silver oxide concentration gradient which decreases with solution movement away from the top and center of the electrode surface. The remaining side and bottom surfaces will remain substantially as divalent silver oxide. The mild reducing agent could also be mixed with the aqueous alkaline electrolyte to form a catholyte and then deposited on the surface of the cathode. When employing this latter approach, the concentration of the reducing agent in the catholyte could be between about 20 and 100 weight percent, preferably between about 30 and about 65 weight percent of the catholyte. Regardless of the approach utilized, the mild reducing agent should not reduce more than about 50 percent of the divalent silver oxide to monovalent silver oxide in order to retain practical cell capacities.

Although not wanting to be bound by theory, it is believed that when employing methanol, the following reactions occur:

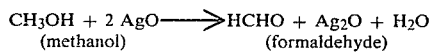 (1)
(methanol)      (formaldehyde)

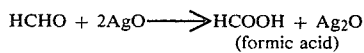 (2)
                 (formic acid)

-continued

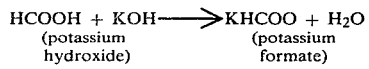 (3)
(potassium          (potassium
 hydroxide)          formate)

It has been found that by reducing a selected area of the divalent silver oxide-containing electrode as described above and incorporating it into an alkaline cell along with an aqueous alkaline electrolyte, the stability of the divalent silver oxide-containing electrode in contact with the electrolyte is improved under high temperature conditions and thereby results in a substantial decrease in cell bulging.

If desired, a cadmium compound and/or zinc oxide could be added to the cell to further improve the stability of the divalent silver oxide-containing electrode in contact with an alkaline electrolyte.

Divalent silver oxide zinc cells discharge at two different potentials with the initial voltage at the higher divalent voltage level until substantially all of the divalent silver oxide is converted to monovalent silver oxide, and thereafter the discharge continues at the lower monovalent voltage level. Consequently, since a substantial layer of divalent silver oxide exists at the side and bottom surfaces of the positive electrode of the cell of this invention prior to discharge, a dual voltage output will be observed rather than a unipotential discharge voltage. To insure a substantial unipotential discharge at the monovalent silver oxide plateau, the teachings of U.S. Pat. No. 3,920,478 can be employed whereby a discontinuous oxidizable metal, such as a zinc screen, is disposed at the interface of the positive electrode and the cell's container. If desired, the resistance of the cell can be decreased by employing the teachings of U.S. Pat. No. 4,015,055 whereby an electronically conductive material, such as nickel, is disposed at the interface of the separator and the positive electrode and extending sufficiently to contact the wall of the container housing the positive electrode. The disclosures made in U.S. Pat. Nos. 3,920,478 and 4,015,055 are incorporated herein by reference.

The preferred embodiment of this invention is to reduce the selected surface of the divalent silver oxide-containing positive electrode in-situ thereby eliminating the need to perform this reduction procedure prior to cell assembly. Additionally, the pretreatment of divalent silver oxide-containing electrodes with a reducing agent outside the cell usually results in the electrode becoming softer and more susceptible to fracture or crumbling on handling. This disadvantage can be avoided by reducing the selected surface of the divalent silver oxide-containing electrode in-situ.

It is also within the scope of this invention to additionally add a minor amount of a stabilizer, a flow agent and/or a lubricating agent to the active positive mix to further alter the physical characteristics of the active positive mix for molding purposes to produce various size and type electrodes. Examples of some of these additives are ethylene bis-stearamide, zinc stearate, lead stearate, calcium stearate and the like.

The silver oxide electrodes of this invention may be employed in an aqueous cell system using an anode such as zinc, cadmium, indium or the like. The electrode couple so selected can be employed with a compatible electrolyte and preferably an alkaline electrolyte. Examples of suitable electrolytes include aqueous solutions of alkaline earth metal hydroxides, such as strontium hydroxide and alkali metal hydroxides, exemplified by sodium hydroxide, potassium hydroxide, lithium hydroxide, rubidium hydroxide and cesium hydroxide. Compatible mixtures of the preceding may be utilized. Preferably, the electrode of this invention should be porous so that the walls of the pores and interstices of the electrode can become wetted by the electrolyte.

EXAMPLE 1

Several lots of cells were produced each using the following components:

| | |
|---|---|
| Cathode Pellet | 0.57 g (89% AgO, 10% CdO, 1% ethylene acrylic acid binder) |
| Anode | 0.33 g amalgamated Zn powder-CMC-KOH gel mixture |
| Cathode Can | Nickel-plated steel |
| Anode Cup | Gold-plated biclad (Cu-stainless steel) |
| Separator | Cellophane/polyethylene with a felted cellulosic fiber mat |
| Other | Zinc screen disposed at interface of cathode pellet and cathode can per teachings of U.S. Pat. No. 3,920,478 |
| Electrolyte addition to separator | 0.033 g 33% KOH |

After the components were assembled in the cell, the anode cup was sealed to the cathode can in a conventional manner.

A sample lot A of these cells contained 0.022 gram of methanol added to the cathode pellet after its insertion in the cathode can. A second sample lot B of these cells contained 0.22 gram of a 50 weight percent solution of methanol in 33 weight percent aqueous potassium hydroxide added to the cathode pellet after its insertion in the can. The two sample lots were stored for one week at 160° F. and then each cell was measured for any bulging, i.e., any increase in the height dimension of the cell. The average bulge of five cells in sample lot A was 0 with the maximum bulge for the worst cell being 0. The average bulge of five cells in sample lot B was 0.001 inch with the maximum bulge for the worst cell being 0.002 inch.

EXAMPLE 2

Several lots of cells were produced as in sample lot B of Example 1 except that a nickel screen was placed at the interface of the separator and cathode and extended to contact the cathode can. In addition, in sample lot A the cathode mix was composed of 80% AgO, 18.9% $Ag_2O$, 1% EAA binder and 0.1% CdO and the percent methanol in the electrolyte is as shown in Table I.

The cells were stored for one week at 160° F. and then each cell was measured for any bulging. The average bulge of five cells per lot and the maximum bulge of the worst cell per lot are shown in Table I. In addition, the average milliampere-hour capacity calculated for three cells per lot when discharged across a 6500 ohm-load to a 1.3-volt cutoff is shown in Table I. Since the cells in each lot were initially made with 10–15 milliampere-hour capacity minimum overbalance of cathode material, there was no loss in service due to the methanol treatment.

TABLE I

| Cell Lot | Catholyte Addition (% Methanol in 33% KOH) | Catholyte Addition Wt., g | Bulge (inch) Average | Bulge (inch) Maximum | Capacity (mAh)* |
|---|---|---|---|---|---|
| A | 0/100 | 0.028 | 0.006 | 0.013 | 167 |
| B | 10/90 | 0.017 | 0.003 | 0.005 | 163 |
| C | 20/80 | 0.028 | 0.005 | 0.006 | 166 |
| D | 50/50 | 0.026 | 0.002 | 0.003 | 167 |
| E | 100/0 | 0.024 | 0.0002 | 0.001 | 168 |

*Cells were discharged at 95° F. after storage for one month at ambient temperature.

EXAMPLE 3

Several lots of cells were produced using the components listed below.

| | |
|---|---|
| Cathode Pellet | Lot A: 0.58 g (80% AgO, 18.9% $Ag_2O$, 0.1% CdO, 1% EAA binder); Lots B and C: 0.58 g (89% AgO, 10% CdO, 1% EAA binder) |
| Anode | 0.32 g amalgamated Zn powder-CMC-KOH gel mixture |
| Cathode Can | Nickel-plated steel |
| Anode Cup | Gold-plated biclad (Cu-stainless steel) |
| Separator | Cellophane/polyethylene with a felted cellulosic fiber mat |
| Other | Zinc screen at interface of cathode and cathode can; Ni screen at cathode/separator interface extended to contact cathode can |
| *Electrolyte addition to separator | 0.033 g 33% KOH containing 1% ZnO and 0.5% $K_2CrO_4$ |

*Lot C contained only methanol-KOH solution in the catholyte addition as shown in TABLE II.

After each cell was assembled, the anode cup was sealed to the cathode can in a conventional manner. The cells were stored for one week at 160° F. and then the average bulge for five cells in each lot was calculated and the bulge for the worst cell in each lot was recorded. The data so obtained are shown in Table II. Three cells in each lot were then discharged across a 6500-ohm load to a 1.3 volt cutoff and the average milliampere-hour capacity for the three cells was calculated for each lot and is shown in Table II. Again a reduction in bulge was observed in the methanol-containing cell without a loss in output service.

TABLE II

| Cell Lot | Catholyte Addition (% Methanol in 33% KOH) | Catholyte Addition Wt., g | Bulge (inch) Average | Bulge (inch) Maximum | Capacity (mAh)* |
|---|---|---|---|---|---|
| A | 0/100 | 0.028 | 0.004 | 0.005 | 168 |
| B | 0/100 | 0.028 | 0.006 | 0.008 | 167 |
| C | 50/50 | 0.027 | 0.002 | 0.003 | 168 |

*Cells were discharged at 95° F. after 3 months' storage at ambient temperature.

It is to be understood that other modifications and changes can be made to the invention herein described without departing from the spirit and scope of the invention.

What is claimed is:

1. A silver oxide cell having an alkaline electrolyte, a negative electrode, a divalent silver oxide-containing positive electrode and a separator disposed between the negative electrode and the positive electrode and wherein the improvement comprises at least a major portion of the surface of the divalent silver oxide-containing positive electrode facing the separator reduced to monovalent silver oxide with the remaining surfaces of the positive electrode being substantially divalent silver oxide.

2. The silver oxide cell of claim 1 wherein the surface of the divalent silver oxide-containing electrode is in-situ reduced by a mild reducing agent.

3. The silver oxide cell of claim 2 wherein the mild reducing agent is an alcohol.

4. The silver oxide cell of claim 1 wherein the mild reducing agent is methanol.

5. The silver oxide cell of claim 1 wherein the electrolyte contains a mild reducing agent.

6. The silver oxide cell of claim 5 wherein the mild reducing agent is methanol.

7. The silver oxide cell of claim 1 or 2 wherein the divalent silver oxide-containing positive electrode is housed in a conductive container and wherein a discontinuous oxidizable metal is disposed at the interface of the positive electrode and the conductive container.

8. The silver oxide cell of claim 1 or 2 wherein the divalent silver oxide-containing positive electrode is housed in a conductive container and wherein an electronically conductive material is disposed at the interface of the separator and the positive electrode and extending sufficiently to contact the wall of the conductive container.

9. The silver oxide cell of claim 8 wherein a discontinuous oxidizable metal is disposed at the interface of the positive electrode and the conductive container.

10. The silver oxide cell of claim 1 or 2 wherein the negative electrode is selected from the group consisting of zinc, cadmium and indium.

11. The silver oxide cell of claim 1 or 2 wherein the negative electrode is zinc.

12. The silver oxide cell of claim 1 or 2 wherein the negative electrode is zinc and the electrolyte comprises aqueous potassium hydroxide.

13. The silver oxide cell of claim 1 or 2 wherein the negative electrode is zinc and the electrolyte comprises aqueous sodium hydroxide.

* * * * *

UNITED STATES PATENT AND TRADEMARK OFFICE
CERTIFICATE OF CORRECTION

PATENT NO. : 4,250,234

DATED : February 10, 1981

INVENTOR(S) : R. A. Langan

It is certified that error appears in the above—identified patent and that said Letters Patent is hereby corrected as shown below:

Column 6, line 9 (claim 4), after the word "claim" delete "1" and substitute therefor -- 2 --.

Signed and Sealed this

Twenty-third Day of June 1981

[SEAL]

Attest:

RENE D. TEGTMEYER

Attesting Officer

Acting Commissioner of Patents and Trademarks